E. CRAIG.
WIRE BOUND BOX BLANK MACHINE.
APPLICATION FILED DEC. 28, 1916.

1,258,989.

Patented Mar. 12, 1918.
9 SHEETS—SHEET 3.

Fig. 5.

E. CRAIG.
WIRE BOUND BOX BLANK MACHINE.
APPLICATION FILED DEC. 28, 1916.

1,258,989.

Patented Mar. 12, 1918.
9 SHEETS—SHEET 5.

E. CRAIG.
WIRE BOUND BOX BLANK MACHINE.
APPLICATION FILED DEC. 28, 1916.

1,258,989.

Patented Mar. 12, 1918.
9 SHEETS—SHEET 6.

Witnesses:

Inventor
Edward Craig
By Arthur F. Durant
Atty.

E. CRAIG.
WIRE BOUND BOX BLANK MACHINE.
APPLICATION FILED DEC. 28, 1916.

1,258,989.

Patented Mar. 12, 1918.
9 SHEETS—SHEET 8.

Witnesses:
Robert F. Weir
Arthur W. Carey

Inventor
Edward Craig
By Arthur F. Durand
Atty

UNITED STATES PATENT OFFICE.

EDWARD CRAIG, OF ST. JOSEPH, MICHIGAN.

WIRE-BOUND-BOX-BLANK MACHINE.

1,258,989.  Specification of Letters Patent.  Patented Mar. 12, 1918.

Application filed December 28, 1916. Serial No. 139,287.

*To all whom it may concern:*

Be it known that I, EDWARD CRAIG, a citizen of the United States of America, and resident of St. Joseph, Berrien county, Michigan, have invented a certain new and useful Improvement in Wire-Bound-Box-Blank Machines, of which the following is a specification.

My invention relates to machines for making wire-bound box-blanks in general, but more particularly to the manufacture of that particular form of box-blank in which only some of the cleats of the box are secured thereto, during the manufacture of the blanks, so that the remaining cleats are not incorporated to fill the gaps in the rows of cleats on the blank until the latter is folded around the end walls of the box, whereby in the manufacture of the blanks the binding wires thereof are each staples to cleats only on every other section of the blank, thus leaving the wires staples only to the veneer or other sheet-material at the places where the gaps are left in the parallel rows of cleats on the inner surface of each blank.

Generally stated, therefore, the object of my invention is to provide a novel and improved machine for making wire-bound box-blanks.

Another object is to provide a machine for making wire-bound box-blanks of the foregoing particular character in which only some of the cleats are secured to the blanks, during the manufacture thereof, so that gaps will be left in the parallel rows of cleats of each blank.

A further object is to provide a machine of this kind having novel and improved means for preventing the driving of staples between blanks, as well as between the different sections of the same blank.

An additional object is to provide means for automatically changing the length of the staples, during the operation of making each blank, so that long staples will be driven where the cleats occur, and whereby only short staples will be driven where the cleats are omitted, thus avoiding the use of long staples where they are not needed.

A further object is to obviate the necessity of using certain devices heretofore considered necessary in the manufacture of wire-bound box-blanks.

It is also an object to provide certain details and features of construction and combinations tending to increase the general efficiency and desirability of a box-blank machine of this particular character.

To these and other useful ends, my invention consists in matters hereinafter set forth and claimed.

Figure 18:
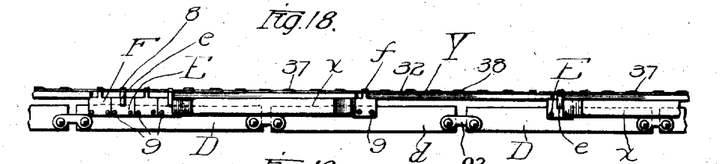
Fig. 18 is a side elevation of a portion of one of the endless link-belts for feeding the materials, illustrating the manner in which several of the blocks shown in Fig. 13 are arranged close together wherever it is desired to establish a space between two adjacent blanks, and whereby these spaces alternate with the blanks in the continuous operation of the machine, thereby insuring projecting ends for the binding wires at the opposite ends of each blank, after the blanks are cut apart, and to permit the twisting together of the opposite ends of each binding wire after the box is completed and filled.
Figure 19:
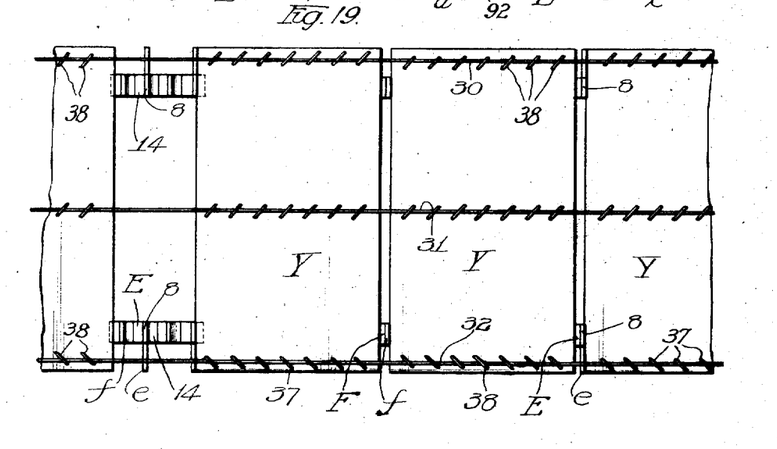
Fig. 19 is a plan of the link-belt structure and the blank materials shown in Fig. 18.
Figure 20:
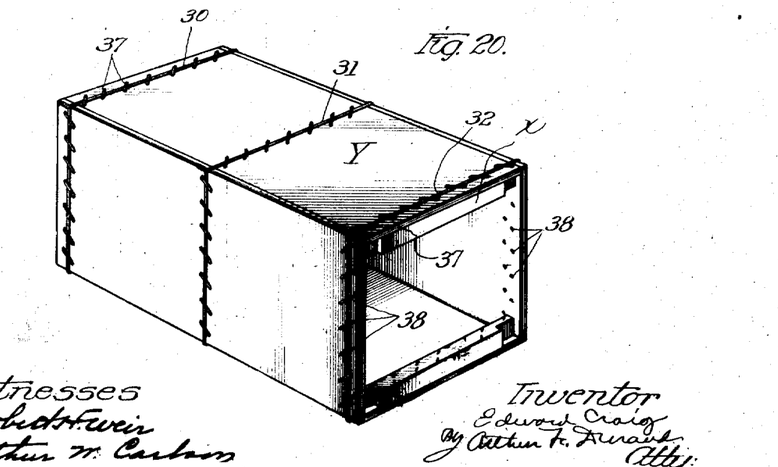
Fig. 20 is a perspective of one of the wire-bound box-blanks made by said machine, showing said blank folded to form a rectangular box, with the opposite ends of each wire twisted together, and with the rectangular head or end wall of the box omitted to show the construction of the blank.

As thus illustrated, my invention comprises a suitable body-frame A supported by standards $a$ and having vertically adjustable screws 1 at their upper ends, the horizontally disposed and parallel guides B being supported on the tops of these screws, whereby said guides can be raised and lowered to suit the requirements. Each guide, it will be seen, is channel-shaped in cross-section to receive and guide the cleats which are to be secured to the veneer and binding wires to form the blanks. At its rear end, the frame is provided with upright side castings C, and these castings are provided with arms $c$ which provide supports for the transverse and horizontally disposed shaft 2 upon which the sprockets 3 are suitably mounted. A similar shaft 4 is supported at the front end of the frame A, by bearings 5 of any suitable character, these bearings being adjustable longitudinally of the machine by means of parallel screws 6 suitably applied thereto, and said bearings sliding on the frame A when they are thus adjusted. Endless sprocket-chains or belts D are supported by the sprockets 3, and by the sprockets 7 mounted on the shaft 4, whereby the upper stretches of these chains or link-belts travel in a substantially horizontal plane, the path of each chain being immediately inside one of the guides B, and each chain being supported by supplemental guides $b$ disposed immediately inside of each cleat-guide. Blocks E are removably and adjustably secured to the link-belts at intervals, and the blocks F alternate on said chains with said blocks E, the latter being provided with fingers $e$ which travel in the guides B to engage the rear ends of the cleats of the blanks. The blocks F have upstanding portions $f$ to engage between the edges of the sections Y of each blank, thus forming spaces between these edges, it being understood that these sections can be made of veneer or other suitable sheet-material, and that said cleats can also be of wood. As shown in Figs. 18, 19 and 20, each box-blank comprises four rectangular sections, and the cleats X only occur on every other section, so that the blocks F do not need the fingers $e$ of the other blocks. In other words, the blocks F only propel the sections having no cleats, whereas the blocks E propel both the cleats and the sections of sheet-material supported on the cleats, thus making it necessary for each block E to have not only a finger $e$ to engage the rear end of the cleats, but also an upstanding portion 8 to extend between the sections of veneer or other sheet-material. As shown in Fig. 18, several of the blocks F are grouped together and mounted on each chain to form a space between adjacent blanks. Set-screws can be inserted in the holes 9 of these blocks to adjustably hold them on the chains or link-belts, so that the distance between the blocks can be varied according to the size of blank to be made, some blanks being much longer than others, of course, in the manufacture of wire-bound boxes of different shapes and sizes. The guides B are also supported for adjustment toward and away from each other, by means of screws 10 suitably mounted on the frame and connected together by a sprocket-chain 11, whereby simultaneous rotation of these screws will shift the guides toward and away from each other. This necessitates, of course, a mounting of the sprockets 3 and 7 in such manner that they can be adjusted toward and away from each other on their respective shafts, thereby permitting the manufacture of blanks of different widths. The guides B are also, it will be understood, suitably supported on the main frame provided by the upright castings C, as by brackets 12 adjustably supported on the horizontal cross-bar 13 of said frame.

Figures 1, 2:
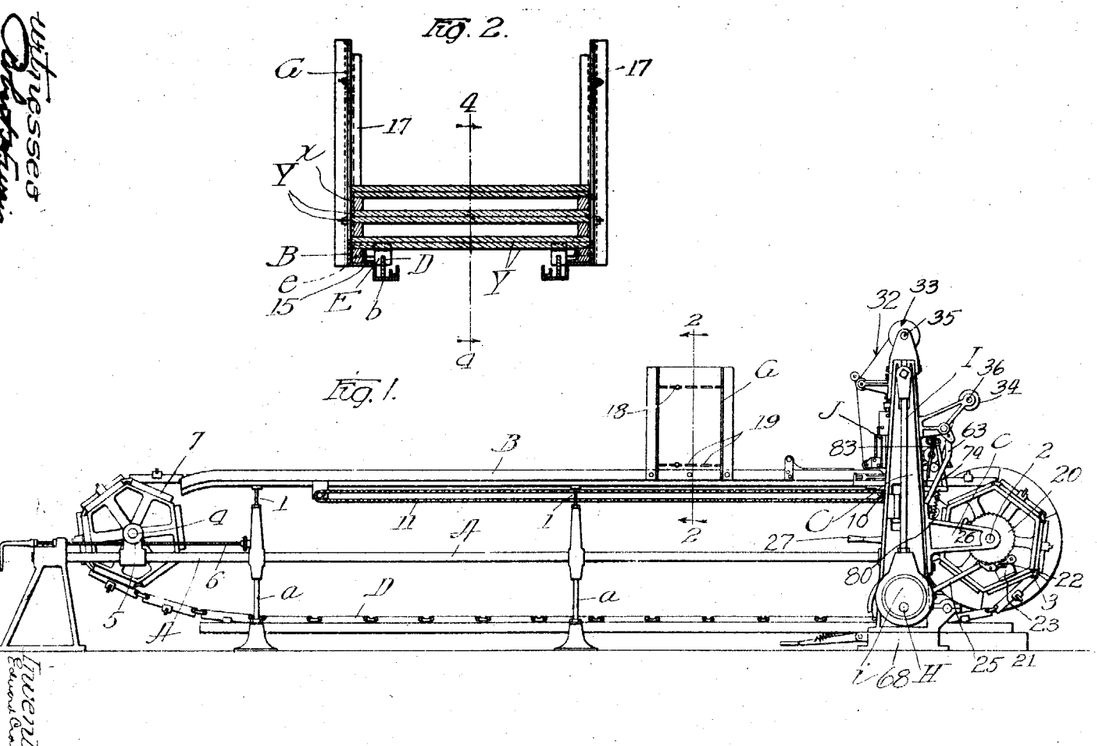
Figure 1 is a side elevation of a wire-bound box-blank machine embodying the principles of my invention.
Fig. 2 is an enlarged cross-section on line 2—2 in Fig. 1.
Figures 3, 4:
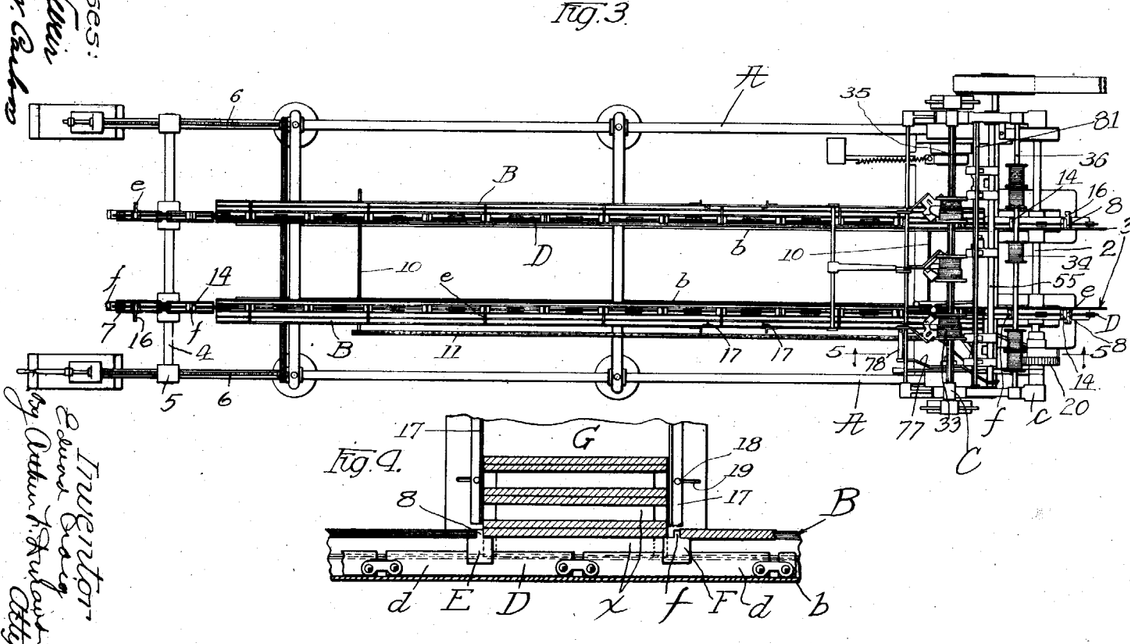
Fig. 3 is a plan of the machine shown in Fig. 1.
Fig. 4 is a vertical detail section on line 4—4 in Fig. 2.
Figure 5:
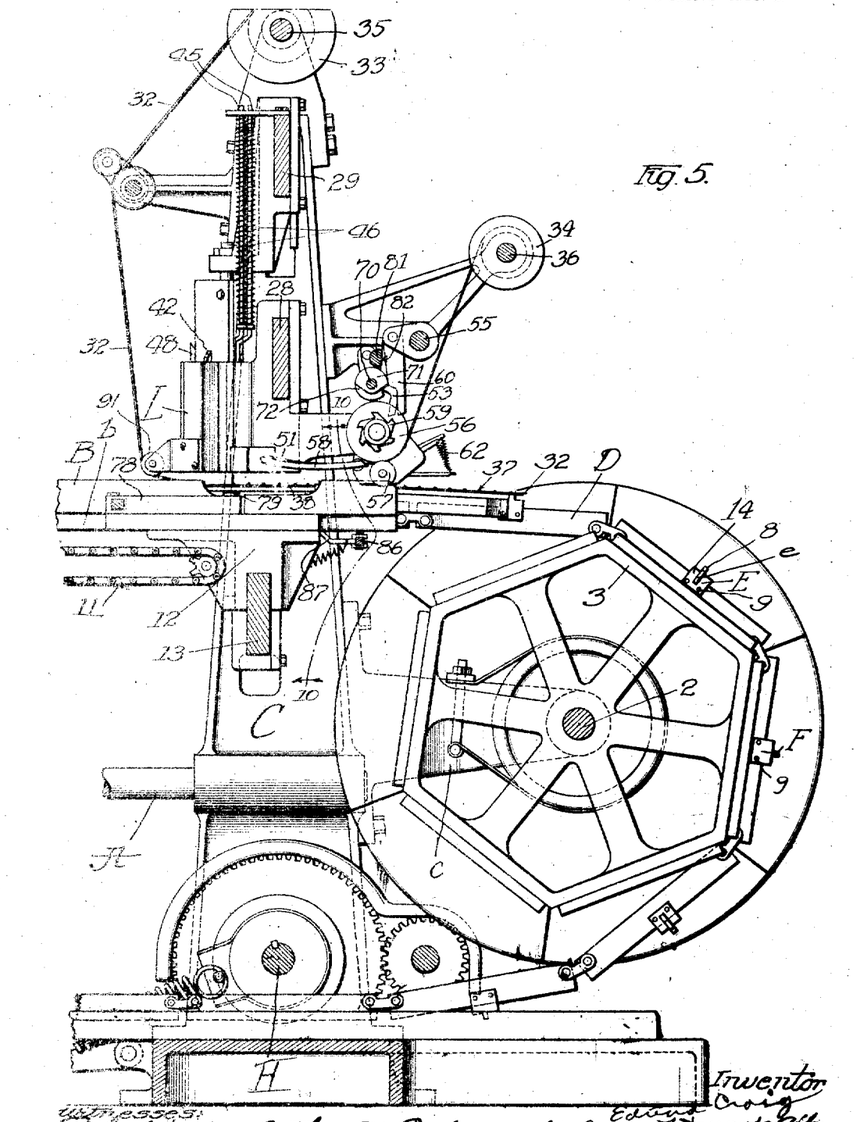
Fig. 5 is an enlarged vertical section on line 5—5 in Fig. 3, looking toward the center of the machine.
Figure 6:
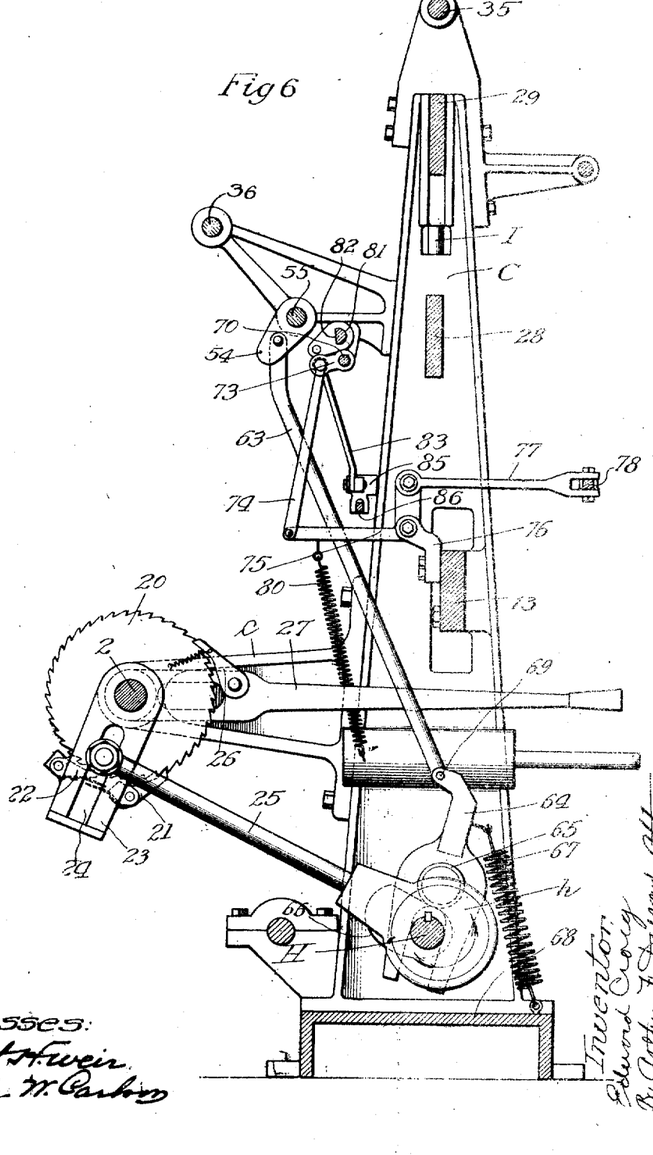
Fig. 6 is also a section on said line 5—5 in Fig. 3, but looking in the opposite direction.
Figure 7:
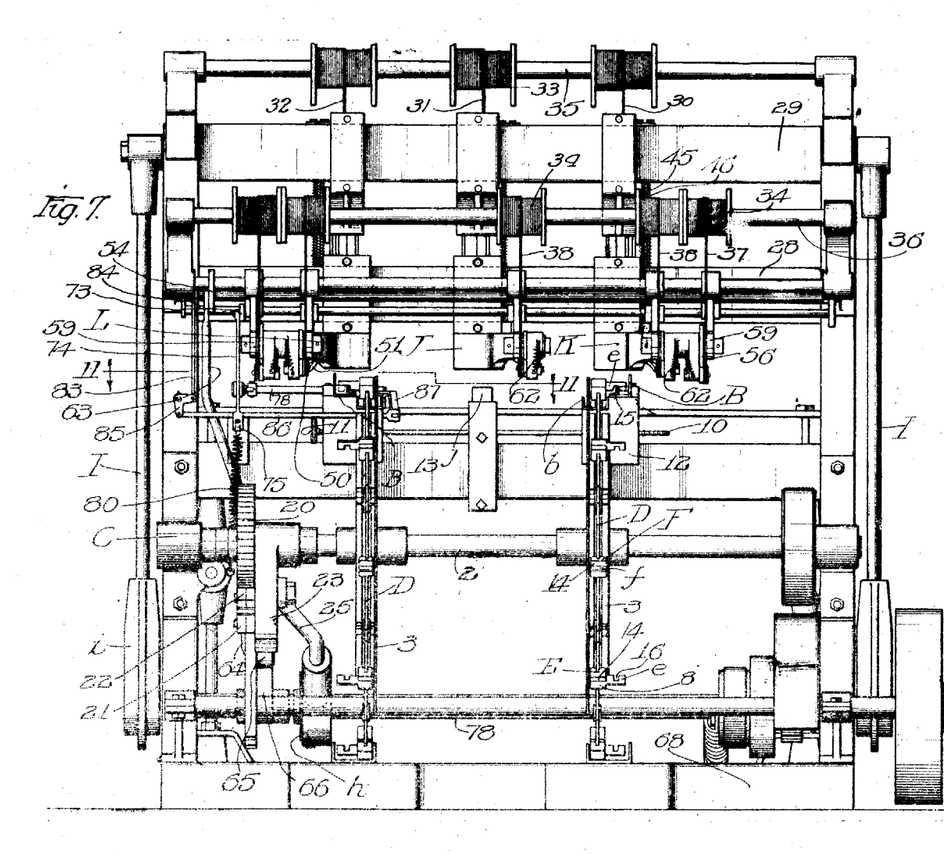
Fig. 7 is a rear end elevation, on a larger scale, of said machine.

For automatically feeding the sheets and cleats to the link-belts, a hopper G is suitably mounted on the guides B, so that the sheets and cleats can be superimposed therein (see Figs. 2 and 4), to feed gradually downward and be automatically removed from the bottom of the hopper by the blocks E and F, as the latter travel along with the sprocket-chains. The cleats drop down into the guides B, in front of the fingers $e$, with a section Y upon each pair of cleats, and then a section Y without any cleats drops down in front of the blocks F, these sections of sheet-material being supported by the shoulders 14 of said blocks, in the manner shown by the drawings, and as will be readily understood. The height of the portions $f$ and 8, it will be seen, is such that they can only engage the rear edge of one sheet or section Y, thus preventing the automatic feeding forward from the bottom of the stack of more than one section at a time. As soon as one section is fully removed from the bottom of the hopper, by the forward feeding movement of the chains D, the next section then drops down behind the previous section, so that in this way four sections are automatically deposited on the feed-chains for each blank. But where the blocks F are grouped together to form a space between blanks, no section Y can drop downward until after these grouped blocks have passed, it being understood that there is one of these groups at each side of the machine, one for each link-belt, and the two groups being arranged directly opposite each other, thereby to insure the proper space between adjacent blanks. The guides B are provided with angle-irons 15, which form the inner sides of these guides. Each finger $e$ is provided with a notch 16 for the upstanding flanges of these angle-irons 15, and the latter have their upper edges disposed in the horizontal plane of the shoulders 14, so that when a section Y which has no cleats falls down at its rear edge, after the section below is nearly out from under, the said edge will rest on top of said angle-irons 15 and be held in position to be engaged by the upstanding portions $f$ of the two blocks F as soon as the preceding section is entirely out from under the hopper. The inner sides of the hopper are provided with vertically disposed angle-irons 17 which are held in place by screws 18 inserted through slots 19 in the sides of the hopper. With this construction, the angle-irons 17, which are disposed in position to engage the corners of the sections of the blank, thus forming the hopper, can be moved toward and away from each other at each side of the hopper, thereby to accommodate cleats of different lengths, and different sizes of sheet-material, depending upon the size and shape desired for the box-blanks. The two sides of the hopper, being secured to the guides B, are movable toward and away from each other when the screws 10 are operated, so that the hopper will always be of the proper size to hold sheets of material for any desired width of blank.

The sprocket-chains or belts D can be operated in any suitable manner. For example, the shaft 2 may be provided with a ratchet-wheel 20, and the main drive-shaft H, disposed transversely at the bottom of the machine, and supported in bearings on the castings C, can be provided with an eccentric device $h$ for operating the ratchet-dogs or pawls 21 and 22 which are pivoted on the arm 23 that swings on the end portion of said shaft. This arm has a slot 24 for adjustment of the end of the pitman 25 that connects the arm with said eccentric device, so that the feed-stroke of the ratchet-mechanism thus provided can be changed or varied at will. A detent 26 is pivoted on the hand-lever 27, to engage said ratchet-wheel 20, so that the ratchet-wheel will not rotate while the pawls 21 and 22 are moving backward over the teeth. This hand-lever 27 is pivoted on the shaft 2 and can be used for stepping the feed-chains or belts D forward, when such is necessary or desirable. Normally, the lever 27 may rest on the main frame, so that its back stroke or motion downward is limited.

The side frames or castings C are connected together by a stationary bar 28 disposed above the sprocket-chains, and by a vertically reciprocating cross-bar 29, the latter being operated up and down on the guides of the frame by the pitmen I which have their lower ends connected by eccentric devices $i$ with the shaft H, so that the bar 29 is reciprocated up and down, its motion being timed properly with respect to the intermittent feeding motion of the link-belts D by which the materials are given a step-by-step motion below said bar. As shown, the blank is provided with three parallel binding wires 30, 31 and 32, and consequently the machine must be provided with three stapling heads for driving the staples by which these wires are secured to the cleats and the sections of sheet-material. The staples for the middle wire 31 are driven by a middle stapler-head J which is mounted on the stationary bar 28, and the staple-former and driver of which are suitably connected with the reciprocating bar 29, this stapler being of any suitable or desired character and disposed in position to drive the staples cross-wise, and preferably obliquely, of said binding wire. A clench-block $j$, of any suitable character, is mounted on the bar 13 below the stapler J and in position to clench the staples on the under side of the blank. A middle reel 33 supplies the binding wire 31 to the stapler J, and a reel 34 supplies the wire to this stapler for the staples, these reels being mounted respectively on the shafts or round bars 35 and 36 disposed transversely of the machine and suitably supported at their ends by the main frame. The staplers K and L, however, which drive the staples for securing the binding wires 30 and 32 in place, are of special construction, inasmuch as these staplers are desirably, as a matter of further and special improvement, of such character that they drive long staples 37 for the sections of the blank which have cleats, and short staples 38 for the sections which do not have any cleats. For example, therefore, the stapler L is constructed as shown in Figs. 14, 15, 16 and 17, being provided with a narrow staple-former 39 for making the short staples 38, and with a wider staple-former 40 for making the staples 37, these staple-formers being of any ordinary or well-known form, and being provided with pivoted loop-bars 41, which are pivoted on the frame of the machine, and having cams 42 for the operation of these loop-bars in the usual and well-known manner. The wire for the staples is fed through the slots 43 at the lower ends of these loop-bars, directly under the staple-formers, and the staples are formed by bending the wire over the loop-bars in the usual manner, each former serving also as a wire-cutter to cut off the proper length of wire. The former 39 makes a short staple, because it cuts off a short length of wire, and the former 40, which is much wider, cuts off a longer length of wire and thus makes a longer staple. The two staple-drivers 44 slide up and down in the bifurcated ends of the staple-formers, in a manner that will be readily understood, and have their upper ends rigidly connected with the bar 29, whereas the staple-formers are yieldingly connected to said bar through the medium of rods 45 and compression springs 46, so that when the staple-formers rest upon the top surface of the blank their downward movement will cease and the staple-drivers will then move downward alone, causing the insertion of the staples in the blank. When the staple-formers start downward, to form a staple on one or the other of the two loop-bars 41, they are locked to the staple-drivers by the latches 47, which engage the upper ends of the staple-formers, and which are pivoted on the staple-drivers, but as soon as these latches strike the stationary cams 48 the staple-formers 39 and 40 are unlocked and the drivers 44 are then free to move downward alone. When the staples 38 are to be driven, wire is then fed only below the staple-former 39; but when the staples 37 are to be made, the wire is then fed only below the staple-former 40. In this way, the two staple-formers take turns at forming the staples, a number of short staples being driven in succession, and then a number of long staples being driven in succession, so that only the sections of the blank which have cleats are provided with long staples, these being necessary to fasten the wires to the cleats and sheets. The sheets which do not have cleats receive the short staples, and automatic means are provided for controlling the supply of wire to the two staple-formers, so that the groups of short staples alternate with the groups of the long staples. The feed-mechanism for feeding the wire for the staples (see Figs. 8 and 9) comprises a pair of rolls 49 and 50 which feed the wire into a tube 51, and from the latter below the staple-former 39, the roll 49 being provided with a ratchet-wheel 52 which is operated by a pawl 53 actuated by the oscillating arm 54, this arm being supported by the rock-shaft 55 which extends transversely of the machine and is supported at its ends on the main body-frame. A pair of rolls 56 and 57 feed the wire into the tube 58, and from the latter below the staple-former 40, the roll 56 being provided with a ratchet-wheel 59 operated by a pawl 60 carried on the oscillating shaft 55, so that both pawls are actuated when this shaft is rocked about its horizontal axis. The pawls 53 and 60 are, of course, pivoted at their upper ends on short arms (see Figs. 8 and 9) fixed on the shaft 55, so that when the arm 54 moves upward the pawls 53 and 60 move downward. The roll 56 is, however, somewhat larger than the roll 49, so that the feeding movement of the wire is greater in the tube 58 than it is in the tube 51, thus causing the difference in the length of the staples. Said feed-rolls are all suitably mounted on the bracket-arm 61, and the lower rolls of the two pairs are controlled by spring-tension-devices 62, of a well-known form, so that the wire is properly gripped between the rolls. The arm 54 is connected by a pitman 63 with the reciprocating member 64, which latter is provided with a roll 65 to be engaged by the cam 66 on the shaft H, a spring 67 being connected between the base 68 of the body-frame and the upper portion of said member, and a pivot 69 being provided between the lower end of said pitman and the upper end of said member. The cam 66 is of a shape and size, and is so positioned on the shaft H, that the shaft 55 is rocked at the proper time to actuate the feed-rolls and feed the wire below the staple-formers when the latter are in raised position, as will be readily understood. A shaft 70 is mounted transversely of the machine, slightly below and to one side of the shaft 55, and is provided with a pair of cams 71 and 72 for engaging the pawls 60 and 53, so that when one pawl is out of engagement with its alloted ratchet-wheel, the other pawl is in operative relation to its ratchet-wheel, thereby precluding the operation of both pairs of feed-rolls at the same time. The shaft 70 is provided with a crank-arm 73 connected by a link 74 with a bell-crank 75, the latter being pivoted at its elbow on its bracket 76 on the body-frame. A link 77 connects the upper end of this bell-crank-lever with the outer end portion of a bell-crank-lever 78 which is pivoted on the side of the guide B to swing in a horizontal plane. The bell-crank-lever 78 has its other end 79 shaped to enter the channel of the guide B (see Figs. 10 and 11) through a lateral opening in said guide, so that it is in the path of the cleats. Consequently, this bell-crank is pressed outward by the cleats, causing the shaft 70 to rock or turn in its bearings. This causes the cam 72 to throw out the pawl 53, thus rendering the feed-rolls 49 and 50 inoperative, but leaving the pawl 60 in position to operate the ratchet-wheel 59, so that wire will be fed only by the rolls 56 and 57, thus driving a series of staples 37 cross-wise of the wires and into the sheets and cleats. When the portion 79 of the bell-crank 78 again moves into the path of the cleats, when the two opposite gaps in the two rows of cleats are brought into position, the short staples 38 are then driven, for the reason that the pawl 60 is thrown out by the cam 71, leaving the pawl 53 in position to actuate the ratchet-wheel 52, whereby no wire is fed by the rolls 56 and 57 when the two pawls 53 and 60 are moved downward. Thus, the devices for feeding the wire for the staples are automatically controlled by means of a device which engages the cleats. This is not to prevent the driving of staples between blanks, or between the separate sections of a blank, but simply to change the length of the staples, so that long staples will be driven in the sections Y having the cleats X, while the short staples will be driven in the sections Y which have no cleats. A spring 80, or any other suitable means, can be applied to the bell-crank-lever 78 to hold the portion 79 yieldingly in the path of the cleats.

It is also desirable, as previously stated, to prevent the driving of any staples whatever in the spaces between blanks, as well as between the sections of the same blank. This is accomplished by means of a rock-shaft 81 mounted transversely of the machine immediately above the shaft 70, and supported in suitable bearings on the body-frame. This shaft has a flat side or cam-portion 82 arranged in position to bear against the pawls 53 and 60, and when this shaft is turned so that the flat side is out of engagement with the pawls, the latter are thereby disengaged from their respective ratchet-wheels. Preferably, this is done automatically by means of a pitman 83 which is connected to the crank-arm 84 on said shaft 81, which pitman is connected to a bell-crank 85 pivoted on the main frame. This bell-crank is connected by a horizontal link 86 with the movable end of a pivot-lever 87, which latter is provided at an intermediate point with a roller 88 arranged in position to engage the side of the chain or link-belt D (see Figs. 10 and 11), whereby this lever 87 is vibrated about its axis or pivotal point 89 to rock the shaft 81 whenever any of the blocks E or F are engaged by the roller 88, thus rendering the staplers inoperative to drive any staples whatever. A spring 90 can be suitably arranged to yieldingly hold the lever 87 in position with the roller 88 in the path of the blocks E and F, against the side of the chain, so that this lever will be pushed outward by said blocks and then automatically moved back toward the chain while the latter is moving along. Thus, when the roller 88 is pushed outward and away from the chain, by the blocks E and F, the devices for feeding the wire for the staples are all rendered inoperative, and no staples are driven.

Figure 8:
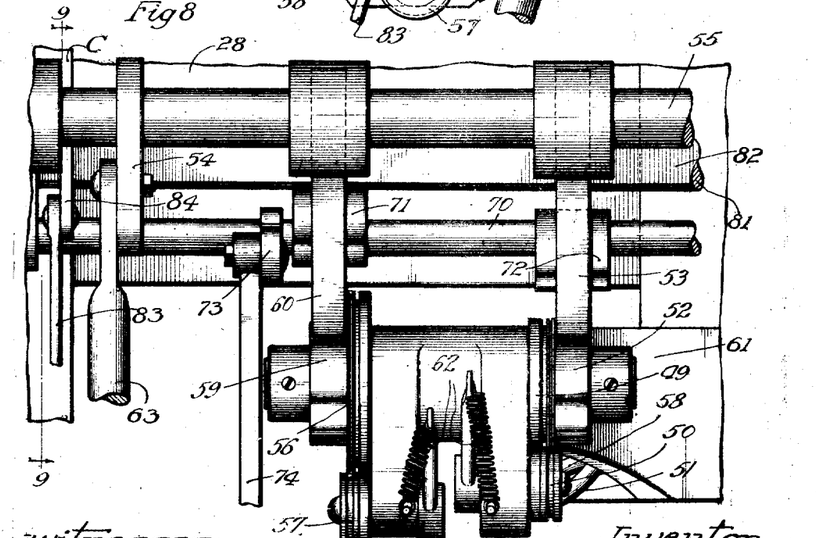
Fig. 8 is an enlarged detail view of certain parts, as shown in Fig. 7.
Figure 9:
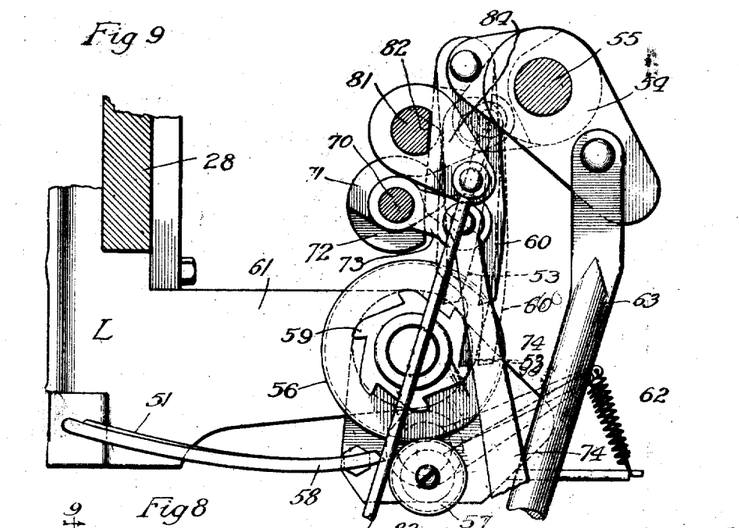
Fig. 9 is a vertical section on line 9—9 in Fig. 8.
Figures 10, 11, 12, 13:
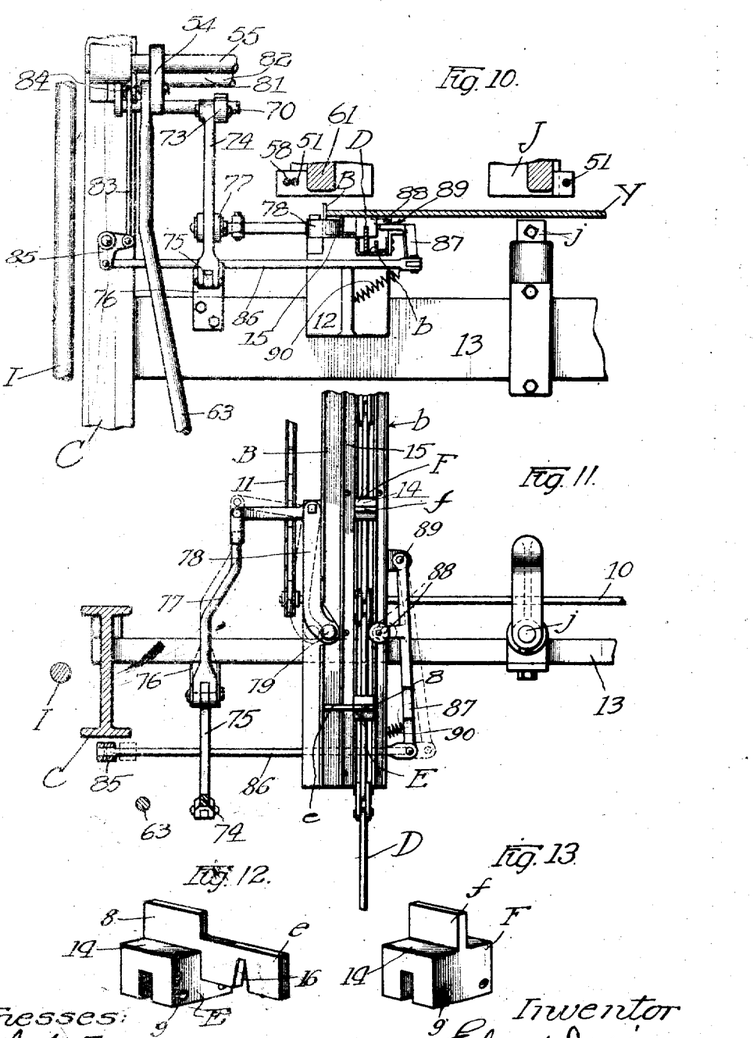
Fig. 10 is a detail sectional view on line 10—10 in Fig. 5.
Fig. 11 is a plan of the devices shown in Fig. 10, being an enlarged section on line 11—11 in Fig. 7.
Fig. 12 is a perspective of one of the blocks employed on the endless link-belts for feeding the materials forward below the staplers of the machine, this form of block being used at the places which are adjacent the rear ends of the cleats of each blank.
Fig. 13 is a perspective of one of the blocks employed on said link-belts at the places which are adjacent the front ends of said cleats.
Figure 14:
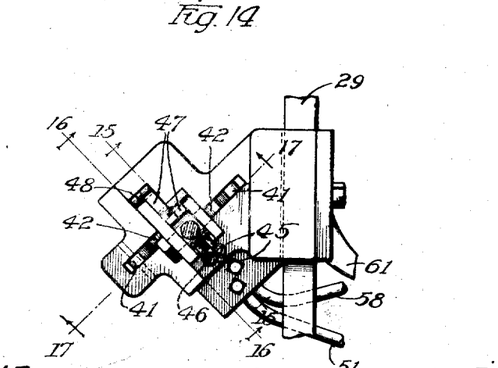
Fig. 14 is an enlarged detail sectional plan view of one of the stapler heads, being a horizontal section on line 14—14 in Fig. 17.
Figures 15, 16, 17:
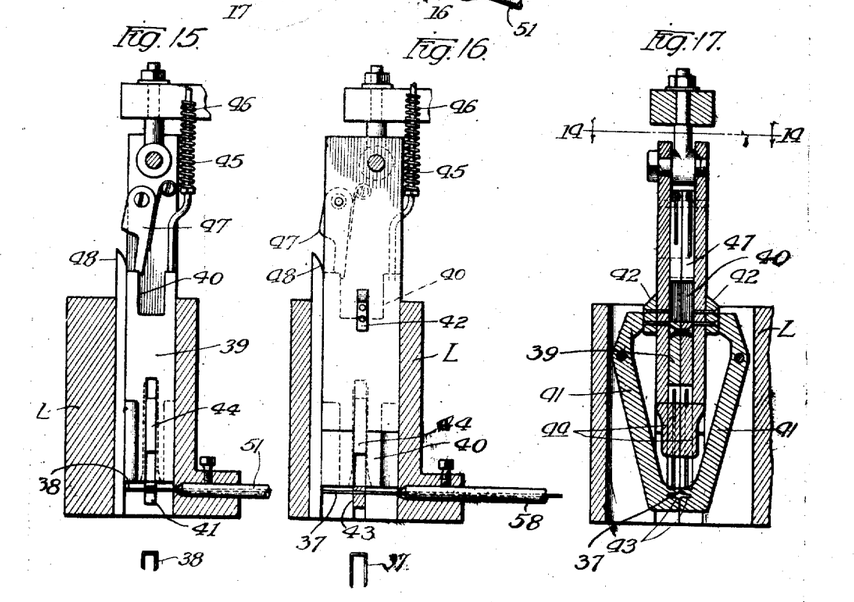
Fig. 15 is a vertical section on line 15—15' in Fig. 14.
Fig. 16 is a similar section on line 16—16 in Fig. 14.
Fig. 17 is a vertical section on line 17—17 in Fig. 14.

It will be understood that the stapler-head K is provided with wire-feeding devices like those of the stapler-head L, such as shown in Figs. 8 and 9, so that both of these stapler-heads are subject to control by the bell-crank-lever 78 in the manner previously described. The middle head J, however, is not equipped with these devices, as it only drives one size of staple, but it is provided, it will be understood, with a wire-feeding device which is subject to control by the shaft 81, so that the operation of this stapler-head is controlled by the lever 87 to automatically prevent the driving of staples between blanks, and also between sections of the same blank, along the middle wire 31 of the blanks.

From the foregoing, it will be seen that a blank is made which is of the form and construction shown in Fig. 20, when the blank is folded, being provided with cleats on every other section Y of the blank, so that the end section which is not provided with any cleats can form the cover of the box. End walls are incorporated in the box, each end wall having a pair of cleats to fill the gaps in the rows of cleats on the blank, so that each end of the box will have four cleats forming a rectangular frame. Said cleats, it will be understood, can be provided with tongue-and-groove formations at their ends, so that the cleats X of the blank will interlock with the similar cleats on the end walls, when the blank is folded.

It will be seen that the staples 38 are located a greater distance inward from the side edges of the blank than are the staples 37, so as to reduce the liability of splitting the veneer at the edges, and that these staples are clenched on the inner surface of the sheet-material of which the sections Y are made. This is accomplished by suitably locating the two staple-drivers 44 of the staple-heads K and L, one driver of each pair, together with its coöperating elements, being disposed a little farther toward the longitudinal center of the blank than the other. Furthermore, it will be seen that the portion 79 of the lever 78 is in the nature of a clench-block or anvil, being disposed (when in the path of the cleats)

directly under the staple-former 39, and the staple-driver coöperating with the latter, so that all of the short staples are clenched on this portion 79 which swings into and out of the path of the cleats. It will be understood, of course, that a similar clench-block is mounted to operate at the other side of the machine, in conjunction with the stapler-head K, so as to clench the short staples at this side of the machine, but this other clench-block does not need to be provided with the connecting elements 73, 74, 75 and 77, for the reason that one connection of this character is sufficient to operate the shaft 70 for the purpose set forth. Thus one of the two pivoted and laterally swinging clench-blocks is suitably connected to control the feeding of the wire from which the staples are made, in the stapler-heads K and L, and in this way said clench-block or anvil has a double function, so to speak, for when it swings into the path of the cleats it not only becomes operative to clench the short staples, but also serves by this movement to stop the driving of the long staples and start the driving of the short staples.

The fingers e are spaced apart a distance on each link-belt substantially equal to the combined length of two cleats, so that each belt is operative to propel cleats for only every other section of the blank, which is sufficient for the purpose, inasmuch as every other cleat is omitted. As shown, the cleats at one side edge of the blank are omitted on the same sections on which they are omitted at the other side edge of the blank. It is obvious, however, that the blocks E and F can be adjusted or re-arranged on the two link-belts in such a manner that the cleats at one side will be directly opposite the gaps in the row of cleats at the other side, whereby each section of the blank will have a cleat at one side of the blank, but will have no cleat at the other side edge of the blank. In other words, the blocks E will not be opposite each other on the two link-belts, but will be opposite the blocks F, so that the gaps in one row of cleats will alternate with the gaps in the other row of cleats, the cleats of the two rows being staggered, so to speak, and the fingers e of one link-belt alternating with the similar fingers on the other link-belt. In such case, obviously, the clench-block at the other side of the machine (similar to the clench-block 79) will be connected to control the wire-feed-mechanism of the stapler-head K, so that long staples will be driven at one side at the same time that short staples are driven at the other side. The invention, therefore, is not limited to the production of a box-blank of the exact or particular form and construction shown and described. But in either case, as will be seen, only some of the cleats are secured to the blank, during the process of manufacture thereof, so that no endwise spacing apart of the cleats is necessary, there being no end-to-end relation of the cleats at any point on the blank. Consequently, the use of many of the devices heretofore considered necessary for spacing between adjacent ends of the cleats is entirely obviated.

Thus the device 78, it will be seen, and its clench-block 79, and the connecting elements leading to this device 78, are operatively connected to the feeding means (the ratchet feed device 20, 21, 22, etc.) through the medium of the feed belt D, and through the medium of the cleats, whereby power is communicated from said feeding means for automatically controlling the stapling mechanism, in the manner previously described. In the machine in conjunction with which my invention is illustrated, the connection between said device 78 and the feeding means is an indirect connection, so to speak, inasmuch as the device 78 does not directly engage the feed belt, but is indirectly engaged and operated by this belt through the medium of the cleats, but in either case or in any event the devices are operatively connected with the feeding means to automatically control the action of the stapling mechanism.

Each of the staplers J, K, L has a guide-wheel 91 disposed a distance in advance of the stapling position, to engage the binding wire, whereby all three binding wires will be guided properly below the staplers. The staplers are stationary, it will be seen, as they are mounted to occupy fixed positions during the operation of the machinery and do not move along to drive the staples. To start the machine, the binding wire must be pulled down by hand and arranged in position to receives the staples. But after the front staples are driven, so that the three wires are fastened to the first section of the blank, the feed-belts D then pull the wires along with the blank. And in this way, said belts serve to automatically feed the sheets and cleats and wires forward below the staplers.

The belts D can be of any suitable character, but preferably each belt consists of a series of single plates d connected end-to-end by short double links 92, and the blocks E and F are adjustable along these plates. Obviously, the devices 79 and 88 are operative to control the action of the staplers for any relative adjustment of these blocks E and F, so that cleats of different lengths can be used for the manufacture of blanks of different lengths.

I do not limit myself to the exact construction shown and described.

What I claim as my invention is:—

1. A machine for making foldable box-blanks by attaching wires and cleats to sheet-material, comprising means to feed the cleats and sheet-material forward, with the cleats omitted at intervals on each blank, mechanism to staple the wires to the sheet-material and cleats, and devices associated with said means and periodically operated during the forward feeding movements of the sheets and cleats for automatically controlling said mechanism to drive long staples into the cleats and short staples where the cleats are omitted.

2. A machine for making foldable box-blanks by attaching wires and cleats to sheet - material, comprising intermittently operated means to feed the cleats and sheet-material forward, with the cleats omitted at intervals on each blank, mechanism to staple the wires to the sheet-material and cleats, and devices associated with said means and periodically operated during the forward feeding movements of the sheets and cleats for automatically controlling said mechanism to drive long staples into the cleats and short staples where the cleats are omitted, said devices including an element to engage the sides of the cleats.

3. A machine for making foldable box-blanks by attaching wires and cleats to sheet-material, comprising means to feed the cleats and sheet-material forward, with the cleats omitted at intervals on each blank, stationary mechanism to staple the wires to the sheet-material and cleats, and devices associated with said means and periodically operated during the forward feeding movements of the sheets and cleats for automatically controlling said mechanism to drive long staples into the cleats and short staples where the cleats are omitted, said mechanism having one set of elements to make and drive the long staples and another set of elements to make and drive the short staples.

4. A machine for making foldable box-blanks by attaching wires and cleats to sheet-material, comprising means to feed the cleats and sheet-material forward, with the cleats omitted at intervals on each blank, mechanism to staple the wires to the sheet-material and cleats, and devices for automatically controlling said mechanism to drive long staples into the cleats and short staples where the cleats are omitted, said mechanism being constructed to insert the short staples at points farther inward from the side edges of the blanks than the long staples.

5. A machine for making foldable box-blanks by attaching wires and cleats to sheet-material, comprising means to feed the cleats and sheet-material forward, with the cleats omitted at intervals on each blank, mechanism to staple the wires to the sheet-material and cleats, and devices for automatically controlling said mechanism to drive long staples into the cleats and short staples where the cleats are omitted, said devices including means to feed different lengths of wire from which to make the staples, and said mechanism having a narrow staple-former to bend the short lengths and a wide staple-former to bend the greater lengths.

6. A machine for making foldable box-blanks by attaching wires and cleats to sheet-material, comprising means to feed the cleats and sheet-material forward, with the cleats omitted at intervals on each blank, and with a space between adjacent blanks, mechanism to staple the wires to the sheet-material and cleats, devices associated with said means and periodically operated during the forward feeding movements of the sheets and cleats for automatically controlling said mechanism to drive long staples into the cleats and short staples where the cleats are omitted, and means controlled by said forward feeding motion to prevent the driving of any staples between blanks.

7. A machine for making foldable box-blanks by attaching wires and cleats to sheet-material, comprising means to feed the cleats and sheet-material forward, with the cleats omitted at intervals on each blank, and with a space between adjacent sections of each blank, mechanism to staple the wires to the sheet-material and cleats, devices associated with said means and periodically operated during the forward feeding movements of the sheets and cleats for automatically controlling said mechanism to drive long staples into the cleats and short staples where the cleats are omitted, and means controlled by said forward feeding motion to prevent the driving of any staples between the sections of each blank.

8. A machine for making foldable box-blanks by attaching wires and cleats to sheet - material, comprising means to feed the cleats and sheet-material forward, with the cleats omitted at intervals on each blank, mechanism to staple the wires to the sheet-material and cleats, and devices for automatically controlling said mechanism to drive long staples into the cleats and short staples where the cleats are omitted, said devices including an element which is movable into the path of the cleats to clench the short staples.

9. A machine for making foldable box-blanks by attaching wires and cleats to sheet-material, comprising means to feed the cleats and sheet-material forward, with the cleats omitted at intervals on each blank, mechanism to staple the wires to the sheet-material and cleats, and devices for automatically controlling said mechanism to drive long staples into the cleats and short staples where the cleats are omitted, said devices including an element operated by the cleats and provided with means to clench the short staples.

10. A machine for making foldable box-blanks by attaching wires and cleats to sheet material, comprising guides for the cleats, endless link-belts arranged to travel parallel with said guides, means on said belts to engage and carry the sheet-material, fingers on said belts to engage the rear ends of the cleats, the fingers of each belt being spaced apart a distance substantially equal to the combined length of two cleats, so that each belt is operative to propel and position cleats for only every other section of the blank, leaving spaces where the cleats are omitted, mechanism to staple the wires to the cleats and sheet-material, means to clench the staples by clenching operations performed in said spaces, and devices to operate said belts.

11. A machine for making foldable box-blanks by attaching wires and cleats to sheet-material, comprising guides for the cleats, endless link-belts arranged to travel parallel with said guides, means on said belts to engage and carry the sheet-material, fingers on said belts to engage the rear ends of the cleats, the fingers of each belt being spaced apart a distance substantially equal to the combined length of two cleats, so that each belt is operative to propel and position cleats for only every other section of the blank, leaving spaces where the cleats are omitted, stationary mechanism to staple the wires to the cleats and sheet-material, devices to intermittently operate said belts, and means movable into and out of the path of the cleats to clench the staples where the cleats are omitted.

12. A machine for making foldable box-blanks by attaching wires and cleats to sheet-material, comprising guides for the cleats, endless link-belts arranged to travel parallel with said guides, means on said belts to engage and carry the sheet-material, fingers on said belts to engage the rear ends of the cleats, the fingers of each belt being spaced apart a distance substantially equal to the combined length of two cleats, so that each belt is operative to propel and position cleats for only every other section of the blank, leaving spaces in the guides where the cleats are omitted, mechanism to staple the wires to the cleats and sheet-material, devices for operating said link-belts intermittently, and devices operatively connected to said feeding means and arranged to be operated by power communicated therefrom for automatically controlling said mechanism to drive long staples in the cleats and short staples where the cleats are omitted.

13. A machine for making foldable box-blanks by attaching wires and cleats to sheet-material, comprising guides for the cleats, endless link-belts arranged to travel parallel with said guides, means on said belts to engage and carry the sheet material in a plane above the cleats, fingers on said belts to engage the rear ends of the cleats, the fingers of each belt being spaced apart a distance substantially equal to the combined length of two cleats, so that each belt is operative to propel and position cleats for only every other section of the blank, leaving spaces where the cleats are omitted, mechanism to staple the wires to the cleats and sheet-material, devices to operate said belts, an element movable into the path of the cleats, and means operated by said element to control said mechanism and cause the driving of long staples in the cleats and short staples where the cleats are omitted.

14. In a stapling machine, a movable element having means to clench the staples, and devices governed by said element to control the driving of the staples.

15. The said machine (substantially as set forth in claim 14), and means to feed material into position for stapling, said element being movable into and out of the path of said material.

16. The said machine (substantially as set forth in claim 14), and means to feed material into position for stapling, said element being operated by said material during the feeding movements thereof.

17. The said machine (substantially as set forth in claim 14), said machine having mechanism controlled by said devices to alternately drive short and long staples.

18. A machine for making foldable box-blanks by attaching wires and cleats to sheet-material, comprising guides for the cleats, endless link-belts arranged to travel parallel with said guides, means on said belts to engage and carry the sheet-material, fingers on said belts to engage the rear ends of the cleats, the fingers of each belt being spaced apart a distance substantially equal to the combined length of two cleats, so that each belt is operative to propel and position cleats for only every other section of the blank, leaving spaces where the cleats are omitted, mechanism to staple the wires to the cleats and sheet-material, devices to operate said belts, and a hopper to automatically feed said cleats and sheet-material in proper order to said belts.

19. A machine for making foldable box-blanks by attaching wires and cleats to sheet-material, comprising a staple forming and driving mechanism for inserting staples to secure the wires and cleats to the sheet-material, a device to feed wire to said mechanism for the staples, and a movable element for clenching staples and connected to control the operation of said device.

20. A machine for making foldable box-blanks by attaching wires and cleats to sheet-material, devices for stapling the wires and cleats to the sheets of each blank with the cleats in parallel rows and with spaces therein where some of the cleats are omitted, and means to clench the staples by stapling operations performed in said spaces.

21. In a stapling machine, a staple forming and driving mechanism, devices to feed the materials into position to receive the staples, and means controlled by said devices during the feeding movements thereof to automatically vary the length of the staples driven in each blank.

22. A machine for making box-blanks by attaching wires and cleats to sheet-material, comprising devices for stapling the wires and cleats to the sheets of each blank with the cleats in parallel rows, and with spaces therein where some of the cleats are omitted, and means including an element which is movable into and out of the path of the cleats to clench the staples in said spaces.

23. A machine for making box-blanks by attaching wires and cleats to sheet-material, comprising mechanism for driving staples to attach the wires and cleats to the sheet-material, belts having blocks thereon to position and feed the cleats and sheets into position to receive the staples, and means including a device operated intermittently by engagement with said blocks to control the action of said mechanism.

24. A machine for making box-blanks by attaching wires and cleats to sheet-material, comprising devices for stapling the wires and cleats to the sheets of each blank with the cleats in parallel rows and with spaces therein where some of the cleats are omitted, and means to clench the staples and prevent depression of the sheet-material into said spaces by said devices during the attaching of the wires where the cleats are omitted.

25. A machine for making foldable box-blanks by attaching wires and cleats to sheet-material, comprising means to feed the cleats and sheet-material forward, with the cleats omitted at intervals on each blank, mechanism to staple the wires to the sheet-material and cleats, and devices operatively connected to said feeding means and arranged to be operated by power communicated therefrom for automatically controlling said mechanism to drive long staples into the cleats and short staples where the cleats are omitted.

26. A machine for making wire-bound box-blanks by stapling parallel binding wires and parallel rows of cleats to sheet material, comprising stapling mechanism, means for feeding the cleats and sheets to said mechanism, with the cleats extending in parallel rows, and with gaps in said rows where some of the cleats are omitted, and means for feeding the binding wires to said mechanism, so that the wires are stapled to the sheet material and cleats to flexibly connect the previously unconnected sections of the blank, and means operating where the cleats are omitted to support the sheet material against the pressure of said mechanism.

Signed by me at Chicago, Illinois, this 8th day of December, 1916.

EDWARD CRAIG.